Feb. 8, 1949.  R. C. DEHMEL  2,460,877
CONTROL APPARATUS
Filed May 1, 1945  2 Sheets-Sheet 1
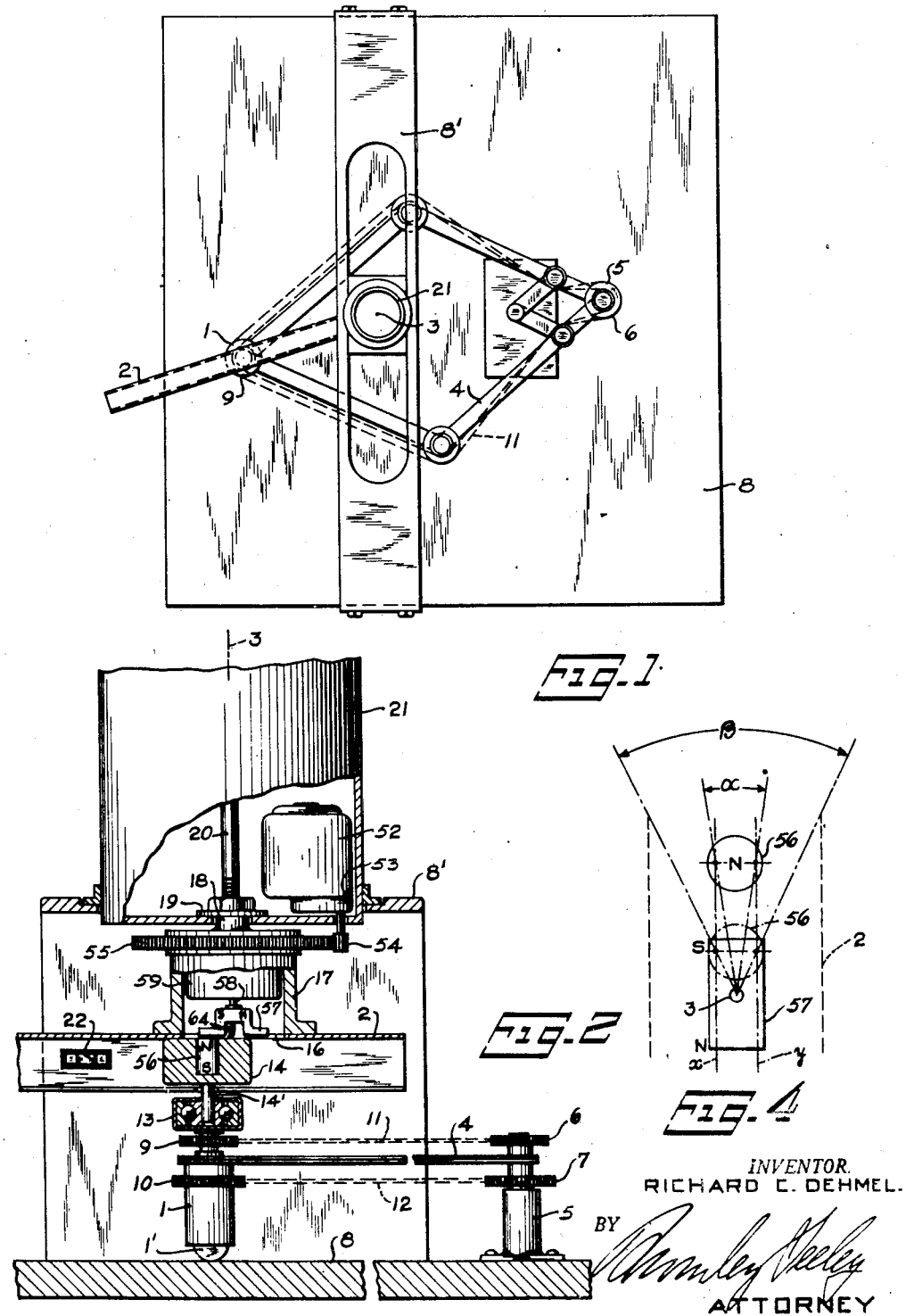
INVENTOR.
RICHARD C. DEHMEL.
BY
ATTORNEY

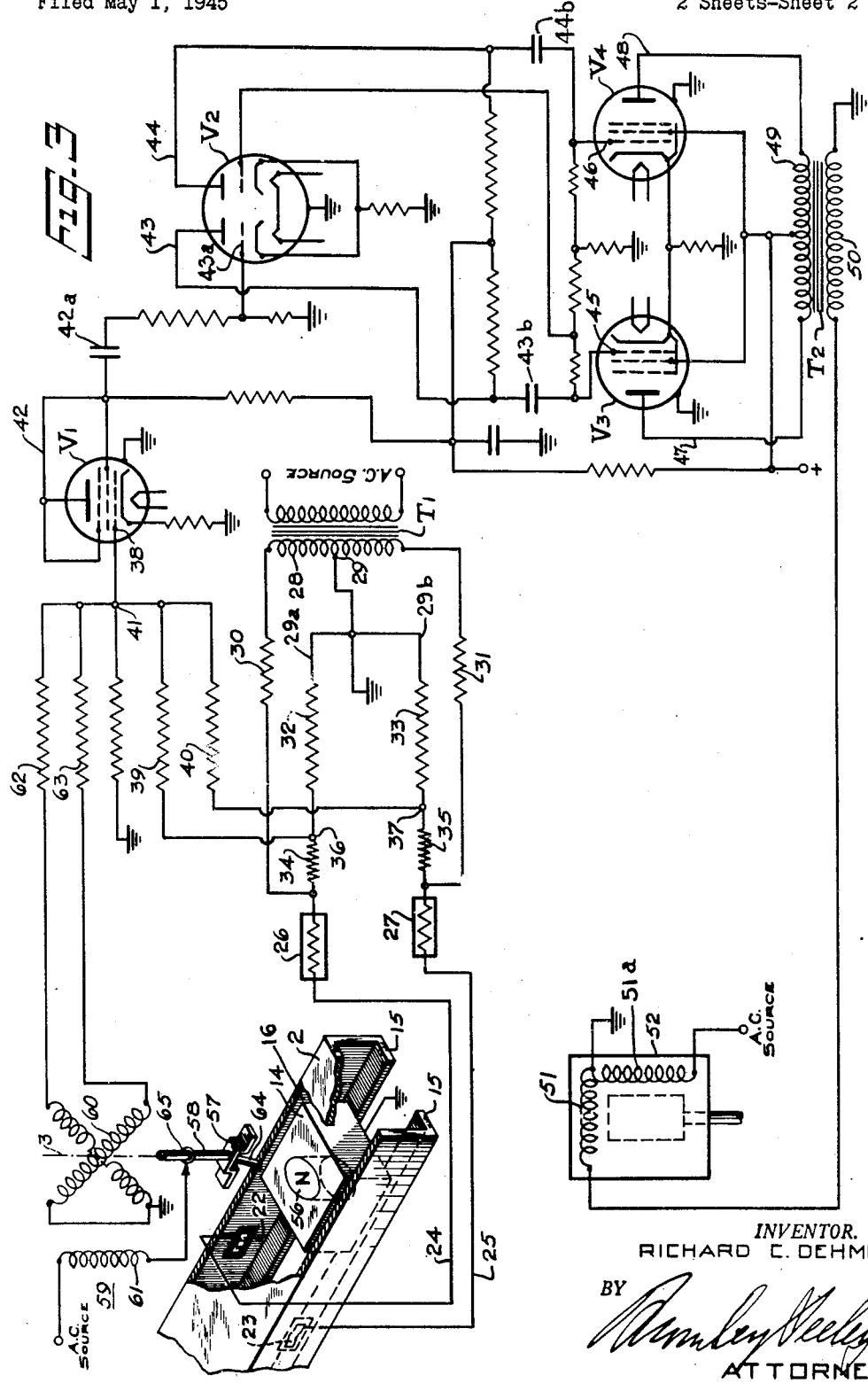

Patented Feb. 8, 1949

2,460,877

UNITED STATES PATENT OFFICE 2,460,877

CONTROL APPARATUS

Richard C. Dehmel, Summit, N. J.

Application May 1, 1945, Serial No. 591,320

19 Claims. (Cl. 35—10)

This invention relates to control apparatus for automatically regulating and applying an operating force to a movable member according to operating needs, particularly under conditions when the mechanical advantage of the means to be operated is comparatively small.

In one form of control apparatus for ground trainers for aircraft pilots, an element movable in accordance with a variable condition, such as a charting element tracing a simulated flight, is mechanically connected to a signal controller operable in azimuth for simulating radio range signals received by an aircraft under actual flight conditions. The charting element, which is traction driven, is ordinarily capable of operating the follow-up member of the signal controller until the moment arm is comparatively small when slipping of the element on the charting surface may occur.

It has been proposed to use a follow-up servo-motor or the like for supplying additional torque for overcoming this difficulty, but in applying this device problems involving rapid oscillation, or "chattering," due to excessive motor torque, have sometimes been encountered because of unpredictable variations in the load resistance.

A principal object of this invention, therefore, is to provide a control apparatus constructed and arranged to automatically adjust under varying conditions the applied force so as to anticipate approximately the needed force for actuating an associated member, such as the signal controller above referred to, so that the operation is smooth and positive and free of violent or undesired movement.

A further object is to provide an improved follow-up servo-motor apparatus that can be accurately and positively controlled by the application, if necessary, of comparatively minute forces.

A further object is to provide an improved self-adjusting control apparatus arranged to increase the maximum amount of applied force as the moment arm through which the force is to be applied decreases.

A further object is to provide an improved self-adjusting control apparatus for gradually increasing the applied force until it approximates the needed force for actuating a member.

A further object is to provide an improved signal control apparatus for an aircraft trainer capable of operating with precision and smoothness, particularly when the simulated flight maneuvering takes place in the close vicinity of the simulated radio range station.

The invention will be more fully set forth in the following description referring to the accompanying drawing, and the features of novelty will be pointed out with particularity in the claims annexed to and forming a part of this specification.

Referring to the drawings:

Fig. 1 is a plan view of charting and control apparatus to which by way of example the present invention is applied;

Fig. 2 is an elevational view, enlarged and partly in section of apparatus shown in Fig. 1;

Fig. 3 is a diagrammatic illustration of the essential elements of my invention; and Fig. 4 diagrammatically illustrates a feature of my invention.

In my Patent No. 2,366,603, granted January 2, 1945, for "Aircraft training apparatus," there is disclosed a charting element movable in accordance with a variable condition, i. e., the instant position of a simulated flight with respect to a radio range station. In Figs. 1 and 2 of the present application there is disclosed apparatus of this character wherein the charting element 1 is driven in accordance with operation of simulated aircraft controls by the student pilot, and it in turn operates a signal control member or unit 2 that is mounted for rotation about the axis 3, representing a radio range station. The charting element 1 may be connected to one end of a pantograph 4, the other end of which is connected to a fixed operating post 5 having a pair of driving sprockets 6 and 7. These sprockets are connected individually to shafts extending downward through the post 5 and supporting panel 8 for suitable connection respectively to operating motors (not shown).

Corresponding driven sprockets 9 and 10 on the charting element are connected by chains 11 and 12 to the driving sprockets 6 and 7, the arrangement being such that rotation of the sprocket 9, which is connected to the traction wheel 1' determines the velocity of the charting element, and rotation of the sprocket 10 which is directly connected to the charting element determines its turning movement or direction. Accordingly, the charting element can move both radially and in azimuth with reference to a given point on the charting surface on the panel 8.

The signal controller to be operated in accordance with movement of the element 1 includes the arm 2 and an operating shaft 20 rotatable therewith and extending upwardly into a relatively fixed cylindrical housing 21. This housing is adjustably mounted, Figs. 1 and 2, on a bridgelike bracket support 8' spanning the panel 8 and encloses electrical apparatus controlled by the operating shaft 20 for attenuating the simulated radio range signals in accordance with the instant position of the simulated flight. This signal apparatus is not shown since illustration thereof is unnecessary for a complete understanding of the present invention.

The operating connection between the charting element 1 and the arm 2 comprises a ball bearing coupling 13 and a slider block 14 having a depending pin 14' forming the hub of the ball bearing coupling. The slider is positioned in the channel-shaped arm 2 so as to slide along the longitudinal axis thereof as it is guided and moved by the element 1. The arm 2 is open at its lower side, except for the slide supporting flanges 15, Fig. 3, and is closed at its upper side except for the rectangular aperture 16, Figs. 2 and 3.

The pivotal support for the arm 2 comprises a cylindrical housing 17, the open lower end of which is attached as indicated to the arm 2 substantially in alignment with the aperture 16. An upper extension 18 of the housing is suitably journaled in the lower supporting wall of the signal controller housing 21 so that the arm 2 hangs on its pivotal mounting at 19. The operating shaft 20 is suitably connected to the extension 18 for operation of the signal control apparatus above referred to.

It will, therefore, be apparent that the freely movable charting element 1 by means of the interconnecting means at 14 is capable of rotating the arms 2 in azimuth so as to follow the instant position in azimuth of the simulated flight, i. e., the position of the charting element. Ordinarily the traction wheel 1' of the charting element applies sufficient force to rotate the arm 2, but when the moment arm between the pin 14' and the center axis 3 becomes small, for example, less than 2 or 3 inches, slippage of the wheel occurs. For this reason an auxiliary force must be applied to the arm 2 for producing sufficient operating torque.

In the preferred form of my invention herein described, the auxiliary force is applied in two steps or stages although it should be understood that my invention is not limited thereto since under certain conditions a single stage may be sufficient.

In the first stage, lateral movement in azimuth of the slider 14 causes selective closing of alternative circuits for controlling and energizing motive means which in turn directly applies an auxiliary force to the arm 2 in the direction and through a distance indicated by the slider 14. The auxiliary force is gradually increased to the necessary amount so that violent oscillation or "chattering" is precluded. This stage may be used to advantage when the moment arm is, for example, between approximately one and three inches.

The second stage is related to the first so that there need be no break in the continuity of the applied auxiliary force. In this stage magnetic control means is responsive to the relative positions of the charting element and control arm 2 for controlling the auxiliary force. This force is so adjusted to a small variable moment arm, such as one inch or less, that the auxiliary force is increased as the moment arm decreases, i. e., the motor torque is automatically increased to the needed amount.

Referring more particularly to Figs. 1 and 3, the apparatus associated with the first stage above referred to comprises a pair of contacts 22 and 23 mounted at opposite sides of and suitably insulated from the arm 2. The contacts are positioned a short distance, such as approximately three inches, from the axis 3 and are arranged to be alternatively or selectively engaged by the slider block 14 which is constructed of conducting material and which is electrically grounded. The slider, Fig. 3, has a limited lateral movement or "play" in the arm 2 so that it can engage either contacts 22 or 23, but not both simultaneously, for energizing a corresponding control circuit. If the contacts 22 and 23 directly control the servo-motor current, the motor might receive excessive current and so give the arm 2 such impetus as to deflect it violently. In such a case, the slider would engage the opposite contact and sustained oscillation or "chattering" would result. On the other hand, too low current cannot overcome the frictional "drag" of the arm 2. If the line voltage and various frictional resistances at bearings, gearing, contacts, etc., were always constant the motor current could be readily adjusted to the required amount and oscillation avoided. However, these factors vary from time to time so that automatic regulation is highly desirable.

The control circuits associated with the contacts 22 and 23 constitute electrical balancing means and include the conductors 24 and 25 which connect the contacts respectively to the terminals of the secondary winding 28 of the transformer $T_1$ through variable resistance elements 26, 27 and the equal resistances 30 and 31. The variable resistance elements 26 and 27 are of the type known to the trade as "Thermistor" and have a negative temperature coefficient of resistance, i. e., the resistance decreases with flow of heating current through the element. The "Thermistor" element when deenergized and cool has a resistance many times larger than its resistance after it has become heated by current.

The transformer secondary has a grounded center tap 29 which is connected through branch circuits 29a and 29b including suitable resistances 32, 34 and resistances 33, 35, to the elements 26 and 27 respectively. The resistances 34, 35 are equal and preferably large as compared with the equal resistances 32, 33. It will, therefore, be apparent that each high resistance branch is arranged to be in shunt with a "Thermistor" element when the corresponding "Thermistor" conductor is grounded by the slider 14.

The junction points 36 and 37, which are in the high resistance branches 29a and 29b of this voltage balancing network, are at equal and opposite potentials when no current is flowing through conductor 24 or 25, i. e., when neither "Thermistor" conductor is grounded. Conversely, when contact 22, for example, is engaged by the slider thereby grounding the conductor 24 and connecting the "Thermistor" 26 in shunt with resistances 32, 34, the gradually increasing current now flowing through that conductor and its "Thermistor" 26 causes a drop in potential at the junction point 36 so as to unbalance the network. By reason of the transformer center tap connection at 29 the instantaneous values of potential at the junctions 36 and 37 are of opposite polarity.

The "unbalance" voltage condition is used for controlling electronic means for controlling in turn the auxiliary motive means previously referred to. To this end the junctions 36 and 37 are connected through resistances 39 and 40 respectively to the control grid 38 of a valve V₁. The valve may be of any suitable type, and is shown connected as a triode. The common connection at 41 is grounded through a resistance, as indicated. The resultant of the unequal voltages, i. e., the net "unbalance" potential occurring between resistances 39 and 40 is the grid control voltage which controls through electronic means the motive means for applying auxiliary force to the arm 2. It will be apparent that the grid control voltage is zero when the junction points 36 and 37 are at equal and opposite potentials due to balancing of the voltages at the resistances 39 and 40.

The output plate circuit 42 of the amplifying valve V₁ is suitably connected through a capacitance coupling 42a to the control grid 43a of any suitable "inverter" or phase shifting arrangement, such as that shown including the twin-tube V₂, for the purpose of producing a pair of control potentials at the output anode circuits 43, 44. These control potentials are approximately 90° out of phase with the potential at tube V₁, the phase of which depends on the "unbalance" potential, i. e., that at junction 36 or 37.

The output circuits 43, 44 of the inverter valve V₂ are in turn connected through capacitance coupling 43b and 44b as indicated to the control grids 45 and 46 respectively of the push-pull amplifier including the power tubes V₃ and V₄. The power amplifying tubes operate in a well known manner in accordance with the control potentials from anode circuits 43 and 44 of tube V₂. The output plate circuits 47 and 48 of the power tubes V₃ and V₄ respectively are suitably connected to the primary winding 49 of the transformer T₂, the secondary 50 of which is connected to an energizing winding 51 of a two-phase motor 52 which is the motive means for supplying the auxiliary force above referred to. Since one phase winding 51a of the motor 52 is energized from a constant phase A. C. source, the phase relation of the current in winding 51, which either lags or leads the current in winding 51a by 90°, determines the direction of rotation of the motor.

The motor 52, Fig. 2, is suitably connected through reduction gearing 53 to an operating pinion 54 for driving the main gear 55 which forms an integral unit with the housing 17 and arm 2. The direction of rotation of motor 52 is determined by the phase of the current in motor winding 51, i. e., by the phase at tube V₁ according to operation of the slider contacts. The tubes V₂, V₃ and V₄ with their associated circuits constitute a push-pull amplifier of well known type. As will be apparent to those skilled in the art, numerous other forms of amplifier may be substituted for the specific arrangement shown.

The second stage above referred to for applying the auxiliary force when the moment arm is quite small also involves the use of a follow-up device. Specifically, a magnetic positioning device is arranged to adjust the applied force to meet the increased torque demands as the moment arm decreases. To this end the slider 14 has mounted for movement therewith a magnetic element 56, such as a small bar magnet of the precipitation-hardened type known to the trade as "Alnico." The magnet is positioned centrally of the slider so as generally to move along the longitudinal axis of the arm 2. For coacting with magnet 56 a second magnetic element 57 such as a small bar magnet is mounted for rotation about axis 3 in a plane perpendicular to the axis of magnet 56. This magnet is normally positioned parallel to the longitudinal axis of the arm 2 on the operating shaft 58 of a voltage producing device, such as the rotary transformer 59, Figs. 2 and 3.

Accordingly, when the magnet 56 approaches the axis 3 the attracted pole of the magnet 57 follows closely the lateral movement of the magnet 56, i. e., slider 14, so as to rotate the transformer control shaft 58 through an operating angle depending on the distance of magnet 56 from the axis 3. This is best illustrated by Fig. 4 which shows the magnet 56 at two different radial distances from the axis 3. The maximum possible lateral movement of the center line of magnet 56 is represented by the limits $x$ and $y$, the side "play" being exaggerated for purposes of illustration. At the farther radial distance the magnet 57 follows the maximum lateral movement of the magnet 56 through the angle $\alpha$ so that this degree of movement of the rotary transformer represents the magnitude of control forces. At the shorter radial distance, however, the magnet 57 follows the magnet 56 through a much larger angle $\beta$ so that this angle represents the larger control force acting through a much shorter moment arm.

The rotary element of the transformer 59, Fig. 3, comprises a two-phase winding 60 that is connected to the shaft 58 and positioned with respect to a fixed winding 61 energized from a suitable A. C. source. In the neutral position of magnet 57 illustrated by Fig. 4 the voltages induced in the two-phase winding are equal and opposite so that no "unbalance" potential appears at the resistances 62 and 63 which connect in opposition the two-phase windings with the junction point 41 at the control grid of valve V₁. When, however, the magnet 57 is rotated from its central position, one of the windings 60 has induced therein a higher voltage than the other so that a resultant or "unbalance" potential appears at the control grid of V₁, the magnitude of this control voltage depending upon the degree of angular movement of the shaft 58, and its phase depending upon the direction of deflection from the central position.

For the purpose of energizing the rotary transformer 59 only when the slider 14 is within the so-called second stage range, a flexible contact 64 depending from the conducting shaft 58 engages the conducting slider 14 as it moves beneath the magnet 57 to ground the winding 61 through the slider 14. The fixed primary winding 61 of the rotary transformer has a suitable slip-ring connection at 65 with the shaft 58 so that this winding is energized only when the slider 14 moves within predetermined distance of the axis 3.

*Operation*

The operation of the system is as follows:
Let it be assumed that the charting element for tracing the simulated flight approaches the radio range station, i. e., axis 3, by a gradually tightening curve. When the radial distance is large, the arm 2 is rotated without difficulty and follows the movement in azimuth of the charting element. When, however, the distance from the slider to the axis decreases nearly to the point where "drag" occurs at the slider, contact 22 or 23 is engaged by the slider 14 as previously described.

If the slider is midway between contacts 22 and 23 and engages neither, equal and opposite voltages from the secondary winding of T₁ are impressed on the resistances 39 and 40. These potentials nullify each other at the grid of $V_1$ and therefore cause no rotation of the motor 52. If, however, the slider engages contact 22, for example, voltage to resistance 39 is shunted to ground through the "Thermistor" element 26 so that junction 36 is at lower potential than junction 37 and a net "unbalance" potential occurs between resistances 39 and 40. Therefore the grid of $V_1$ is energized by a resultant voltage which corresponds in phase to the predominant voltage at junction 37. When this voltage is amplified at $V_1$ and transformed into control voltages by the inverter tube $V_2$ and then applied to the push-pull power amplifying tubes $V_3$ and $V_4$, the motor 52 is caused to rotate arm 2 in such direction as to move the contact 22 away from the slider.

The "Thermistor" resistance is gradually and materially reduced by the heating effect of current flowing through it so that current through the "Thermistor" increases and less current flows through the shunted conductor including the junction point 36. Accordingly, a decreasing voltage appears across the resistance 39 and a progressively greater "unbalance" potential at the grid of $V_1$ causes a progressive increase in current to the motor 52. The current increase continues until it is just sufficient to produce adequate torque on the motor 52 to overcome the friction at arm 2 so as to disengage the contact 22 from the slider. Opening of the circuit at 22 restores the voltage balance at the grid of $V_1$ and removes torque from motor 52. There is no further movement of arm 2 until slider 14 again engages either contact 22 or 23. It should be noted that during this operation, the "Thermistor" element has gradually, rather than abruptly, introduced the shunting effect. Therefore the arm 2 is moved slowly out of engagement with contact 22 so that large momentum is not built up to cause the arm 2 to "overshoot" and close the opposite contact 23 against the slider. "Chattering" is thereby precluded.

As the slider further approaches the axis position 3, the magnet 57 comes within the influence of the slider magnet 56 so that lateral movement of the slider causes the magnet 57 to follow it and to rotate the two-phase winding 60 of transformer 59, Figs. 2 and 5.

The angular displacement of the transformer windings causes an "unbalance" voltage to appear at the grid of $V_1$, as previously described, and the motor 52 to be energized. The amount of motor current depends on the magnitude of the "unbalance" voltage and hence the degree of angular displacement of windings 60 so that greater torque current is available when the moment arm is very short, as illustrated by Fig. 4. The phase of the motor current, and hence its driving direction, is determined by the predominant voltage at resistance 62 or 63, i. e., the direction of deflection of magnet 57, thereby assuring rotation of the motor and gearing 54, 55 in a direction to move the arm 2 into alignment with the slider 14. In the neutral position, the rotary transformer windings are realigned so that the voltages at resistances 62 and 63 balance each other, and torque at the motor is removed.

I have found that apparatus embodying my invention is efficient and accurate and that a high degree of precision of orientation can be obtained by the magnetic device above described even when the magnets are separated a material distance. By reason of this precise control, the course charting element is unrestrained and can maneuver freely in the close vicinity of the axis 3, while at the same time causing arm 2 to follow the change in bearing of the charting element from the axis.

Although I have illustrated my invention as applied to control apparatus for an aircraft trainer, it should be understood that my invention is not limited thereto and that it has general application to control apparatus wherein precision of operation of a driven element, subject to greatly varying load resistance, is desired.

It should be understood that my invention is not limited to the specific details of construction and arrangement thereof herein illustrated, and that changes and modifications may occur to one skilled in the art without departing from the spirit of my invention.

I claim:

1. Control apparatus comprising a variably movable element, a follow-up member arranged to be actuated by said element through structure having a variable mechanical advantage, electric motive means for providing auxiliary power for operating said follow-up member and electric control means operable only when the mechanical advantage of said structure has decreased to a predetermined minimum for energizing said motive means, said control means also being effective to increase the current supply to said motive means so as to increase in accordance with further decrease in magnitude of said mechanical advantage the auxiliary force acting on said follow-up member.

2. In control apparatus having an element movable both radially and in azimuth from a given center and a follow-up unit movable by said element and mounted for rotation about said center, means for providing auxiliary torque for rotating said unit comprising motive means operatively connected to said unit, means for controlling said motive means when said element moves within a predetermined distance from said center, and additional means operable to control said motive means within relatively small radial distances between said center and the range of operation of said first-named controlling means.

3. In an aircraft trainer having an element movable both radially and in azimuth from a given center and a follow-up unit mounted for rotation in azimuth about said center and movable by said element, means for providing auxiliary torque for rotating said unit when the moment arm is small comprising motive means operatively connected to said unit, means for controlling said motive means when said element moves within a predetermined distance from said center, and magnetic means operable to control said motive means within relatively small radial distances between said center and the range of operation of said first-named controlling means.

4. Control apparatus comprising a variably movable element, a follow-up unit movable by said element, motive means for providing auxiliary force for moving said unit, magnetic control means movable in accordance with the relative movement of said element and said unit, and means controlled in accordance with the extent of movement of said magnetic means including relatively movable induction means for producing unbalanced control voltages of varying magnitude for proportionately energizing said motive means.

5. In control apparatus having an element movable both radially and in azimuth from a given center and a follow-up unit mounted for rotation about said center and movable by said element, motive means for providing auxiliary torque for rotating said unit, and means for controlling said motive means when said element moves within a predetermined distance from said center comprising magnetic means positioned in accordance with movement of said element with respect to said unit and means controlled by said magnetic means for causing energization of said motive means.

6. In control apparatus having an element movable both radially and in azimuth from a given center and a follow-up unit mounted for rotation in azimuth about said center and movable by said element, means for providing auxiliary torque for rotating said unit when the moment arm is small comprising motive means operatively connected to said unit, magnetic positioning means having coacting elements associated with said unit and element respectively operable in accordance with relative movement of said element tending to rotate said unit, and means operatively related to said positioning means for controlling said motive means.

7. Control apparatus having an element freely movable both radially and in azimuth from a given center, a follow-up unit movable by said element having a lever arm mounted for rotation about said center and means for providing auxiliary torque for rotating said unit according to the magnitude of the moment arm between said element and said center comprising motive means operatively connected to said unit for rotating the same, a magnetic following device operable in accordance with relative movement of said element with respect to said control unit tending to rotate said unit, and means controlled in accordance with the extent of movement of said device for causing proportionate energization of said motive means.

8. Control apparatus comprising primary actuating means for moving a control member, said actuating means also being movable with respect to said control member so that a variable actuating force is required according to certain relative positioning of the actuating means and control member, a magnetic element movable with said actuating means, a second relatively fixed magnetic element responsive to said first element, motive means for applying an auxiliary force to aid said actuating means when the distance between said magnetic elements has decreased to a predetermined minimum, and means controlled by said relatively fixed magnetic element in accordance with relative movement and distance between said magnetic elements for regulating said motive means as to sense and magnitude respectively.

9. Control apparatus comprising an element movable in accordance with change in a variable condition, a follow-up unit movable by said element, motive means for providing auxiliary force for driving said unit, and means for controlling said motive means comprising a magnetic member movable with said element, a coacting magnetic member carried by said unit normally aligned along a central axis thereof, a rotary transformer operatively connected to said coacting magnetic member for producing an unbalanced voltage condition when said coacting magnetic member is moved by said first magnetic member from said central axis position, and means controlled by said unequal voltage condition for supplying energizing current to said motive means corresponding in driving direction to the direction of movement of said element.

10. In aircraft training apparatus a charting element freely movable both radially and in azimuth about a given center representing a radio-range station to simulate the instant flight position of an aircraft, a control member rotatable about said center, means interconnecting said charting element and said member for causing rotation of said member as said element moves in azimuth, said interconnecting means movable radially of said member and having limited lateral movement with respect thereto, a magnetic element movable with said interconnecting means, a coacting magnetic element rotatably mounted substantially at said center and aligned with the central position of said first magnetic element, said coacting magnetic element being responsive to lateral movement of said first magnetic element in increasing degree as the radial distance from said first magnetic element to said center decreases, motive means for producing auxiliary torque for rotating said member when the moment arm corresponding to said radial distance is comparatively small, and means controlled by said coacting magnetic element for regulating said motive means in accordance with the position of said first magnetic element as determined by movement in said lateral and radial directions.

11. Control apparatus comprising a driving element and a driven element, the torque needed for operating said driven element by said driving element varying over a material range, motive means for supplying auxiliary torque under predetermined conditions of torque variation, and means for controlling said motive means comprising an electrical balancing circuit, means responsive to predetermined movement of said driving element for producing in said circuit a control voltage, a second electrical balancing circuit, means responsive to further predetermined movement of said driving element for producing in said second circuit a control voltage, and electronic means having control grid structure arranged to be energized selectively by said voltages, and amplifying means associated with said electronic means for causing energization of said motive means.

12. Control apparatus comprising a variably movable element, a follow-up unit movable by said element, the actuating force required to move said unit varying according to relative positioning of said element and unit, motive means for providing auxiliary force for driving said unit, and means for controlling said motive means comprising means responsive to change in the relative positions of said element and said unit, said responsive means having relatively movable windings for producing when said element is in a position tending to move said unit a plurality of unequal voltages, and means controlled by the resultant of said voltages for supplying an energizing current to said motive means corresponding in driving direction to the direction of movement of said element.

13. Control apparatus comprising a variably movable element, a follow-up unit movable by said element, motive means for providing auxiliary force for driving said unit, and means for controlling said motive means comprising a magnetic device responsive to change in the relative positions of said element and said unit, a rotary transformer operatively connected to said device for producing a pair of unequal voltages when said element is in a position tending to move said unit, and electronic means controlled by the resultant of said voltages for supplying an energizing current to said motive means corresponding in driving direction to the direction of movement of said element.

14. An electrical follow-up system including an element movable in accordance with change in a variable condition, a member movable by said element and means for providing auxiliary force for moving said member comprising motive means operatively connected to said member, control means operable in accordance with movement of said element tending to move said member, electrical means responsive to said control means for energizing said motive means, and an impedance associated with said electrical means having a negative temperature coefficient for causing gradual increase in the applied force of said motive means to an amount sufficient to move said member.

15. An electrical follow-up system as set forth in claim 14 in combination with means for abruptly terminating the applied force in response to initial movement of the member.

16. An electrical follow-up system including an element movable in accordance with change in a variable condition, a member rotatable by said element and means for providing auxiliary force for rotating said member comprising motive means operatively connected to said member, control means operable in accordance with movement of said element tending to rotate said member, electrical means controlled by said control means for energizing said motive means, and a progressively variable impedance associated with said electrical means for gradually increasing the torque of said motive means to an amount sufficient to rotate said member.

17. An electrical follow-up system as set forth in claim 16 in combination with means for de-energizing the motive means and abruptly terminating the torque in response to initial rotation of the member.

18. An electrical follow-up system including a variably movable element, a follow-up member movable by said element and means for providing auxiliary force for moving said member comprising motive means operatively related to said member, electrical control means operable in accordance with limited movement of said element tending to move said member for energizing said motive means, and an impedance associated with said electrical means having a negative temperature coefficient for causing gradual increase in the applied force of said motive means to an extent sufficient to move said member.

19. Control apparatus comprising a variably movable element, a rotatable follow-up member arranged to be actuated by said element through a variable lever arm, electric motive means for providing auxiliary power for operating said follow-up member and electric control means operable only when said lever arm has decreased to a predetermined minimum for energizing said motive means, said control means also being effective to increase the current supply to said motive means so as to increase the auxiliary force acting on said follow-up member in accordance with further decrease in magnitude of said lever arm.

RICHARD C. DEHMEL.

REFERENCES CITED

The following references are of record in the file of this patent:

UNITED STATES PATENTS

| Number | Name | Date |
|---|---|---|
| 1,377,306 | Brush | May 10, 1921 |
| 1,621,835 | Davis | Mar. 22, 1927 |
| 1,973,279 | Bernarde | Sept. 11, 1934 |
| 2,171,561 | Hoover | Sept. 5, 1939 |
| 2,226,726 | Kramer | Dec. 31, 1940 |
| 2,326,764 | Crane | Aug. 17, 1943 |
| 2,332,523 | Norden | Oct. 26, 1943 |
| 2,339,861 | Keeler | Jan. 25, 1944 |
| 2,346,693 | Lyman | Apr. 18, 1944 |
| 2,346,838 | Haight | Apr. 18, 1944 |
| 2,352,103 | Jones | June 20, 1944 |
| 2,352,216 | Melvin | June 27, 1944 |
| 2,366,603 | Dehmel | Jan. 2, 1945 |
| 2,389,359 | Grow | Nov. 20, 1945 |
| 2,415,819 | Halpert et al. | Feb. 18, 1947 |